(No Model.)  2 Sheets—Sheet 1.

A. PAUL.
BRAKE FOR VEHICLES.

No. 421,607. Patented Feb. 18, 1890.

Witnesses.
H. de Vos.
E. L. Richards

Inventor:
Albert Paul,
By Richards
Attorneys.

(No Model.) 2 Sheets—Sheet 2.

A. PAUL.
BRAKE FOR VEHICLES.

No. 421,607. Patented Feb. 18, 1890.

Witnesses:
H. de Vos.
C. L. Richards.

Inventor:
Albert Paul,
By Richards & Co.
Attorneys.

United States Patent Office.

ALBERT PAUL, OF BERLIN, GERMANY, ASSIGNOR OF ONE-HALF TO AUGUST VON DER HEYDEN, OF SAME PLACE.

BRAKE FOR VEHICLES.

SPECIFICATION forming part of Letters Patent No. 421,607, dated February 18, 1890.

Application filed March 18, 1889. Serial No. 303,704. (No model.)

*To all whom it may concern:*

Be it known that I, ALBERT PAUL, of the city of Berlin, Germany, have invented certain new and useful Improvements in Brakes for Street and Railway Vehicles, of which I declare the following to be a full and true description.

This invention relates to the construction of a brake for ordinary street-vehicles, and railway and tramway cars or carriages, the object of which is to produce a gradual or a sudden braking of the vehicle by employing a proportionately slight force or power. The construction of the brake is very simple, and may be applied to any vehicle without making essential alterations.

Figure 1:
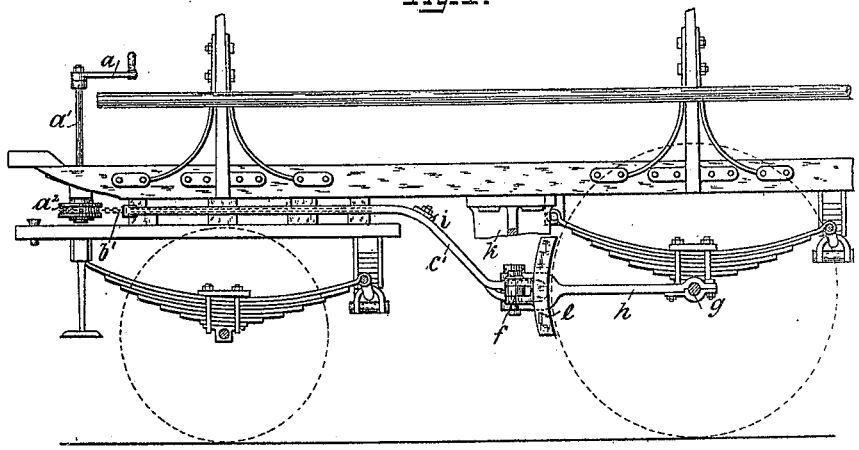
Figure 2:
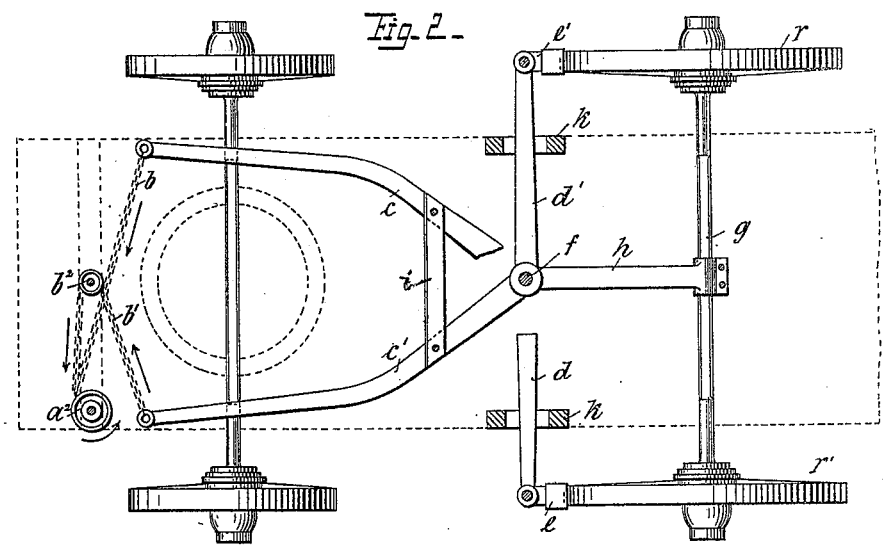

In the accompanying drawings, Figures 1 and 2 represent the construction of a brake according to my invention applied to an ordinary spring cart or van. Fig. 1 is a side view, partly in section, of a cart with the brake applied to the same. Fig. 2 is a top view of the same, with the upper part of the vehicle removed and the unimportant parts of the frame omitted.

The transmission of power to the brake takes place, as usual, from the coachman's seat by means of a crank $a$, the spindle $a'$ of which carries below the cart a chain or rope pulley $a^2$, to which the ends of two pieces of chain or rope are fixed, the other ends of which are attached to the free ends of the long arms $c\ c'$ of the shear-levers, which are made in the form of bell-crank levers, and carry at the ends of the other arms $d\ d'$ the brake-blocks $e\ e'$, which are suitably articulated to the said arms. The chain $b'$ runs over a rotary roller $b^2$, attached to the frame-work of the vehicle, so that by operating the crank $a$ an opposite movement—that is, a closing or approaching of the arms $c\ c'$ of the shear-levers—is produced, whereby, on the other hand, the brake-blocks $e\ e'$ are pressed onto the tires of the hind wheels $r\ r'$. The fulcrum $f$ of the shear-lever lies on the same level with the rear axle $g$ of the vehicle, and has its bearings in the bifurcated carrier $h$, which is securely attached to the axle $g$. As soon as the crank $a$ has been released, the brake-blocks $e\ e'$ are immediately released by a volute, spiral or other spring $i$, arranged between the lever-arms $c\ c'$. The lever-arms $d\ d'$ are guided in the carriers $k\ k'$, attached to the frame-work of the vehicle. The arrangement of the brake-blocks on the shearlike levers renders it possible that by exercising a comparatively light power on the crank $a$ an enormous force can be exercised on the wheels of the vehicle by the brake-blocks, so that even when the vehicle is driven at the greatest speed the same can be immediately braked, while by a suitable choice of the diameter of the chain-wheel and the proportions of the lever a slight movement of the crank will suffice to press the brake-blocks onto the wheels.

The crank-spindle $a'$ can be provided with a ratchet-wheel similar to those employed with the ordinary tram-car brakes, into which a pawl pivoted to the flooring or other part of the car or carriage gears, so as to keep the brake partially or fully applied to the wheels when driving down an incline or when the car is left standing in the street without attendance.

The arrangement of the rollers or pulleys for transferring the force exerted on the crank to the lever-arms can be modified according to requirements without departing from the nature of my invention.

Figure 3:
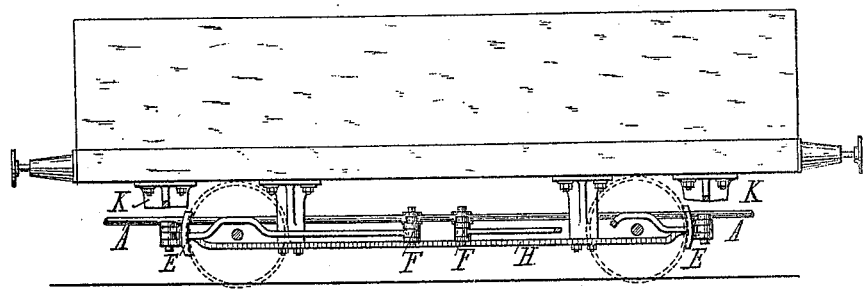
Figures 4, 5:
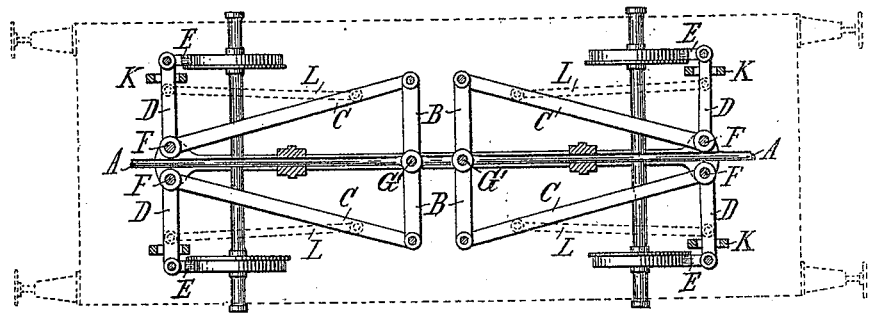
Figure 6:
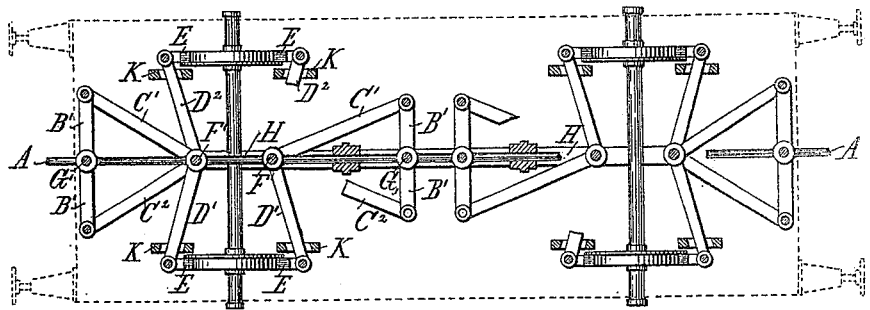
Figure 7:
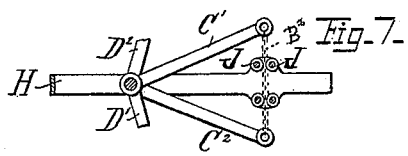

Figs. 3 to 7 relate to a modification of my invention as applied to railway and tramway vehicles. Fig. 3 is the side view of a railway goods-car with my improved brake applied to the same. Fig. 4 is a plan or top view with the upper part of the car removed. Fig. 5 is an elevation of the guide-block for the brake-lever. Fig. 6 represents a modified arrangement of the brake for simultaneously braking the wheels of the vehicle from both sides. Fig. 7 represents a further modification of my improved brake.

In the brake construction represented by Figs. 3 and 4, and in which the brake-blocks E only operate on one side of the wheels, the said brake-blocks are attached to the short arms D of bell-crank levers which are arranged to turn on the pivot F, carried in a suitable bearing beneath the frame of the vehicle. The ends of the long lever-arms C of the said bell-crank lever are connected by suitable articulated rods or arms B to the main brake-rod A, running longitudinally under the frame of the vehicle, which, when operated, will transmit the force exercised by an ordinary brake-spindle, a vacuum, air or other brake to the levers. No special mechanism for operating the lever combination being claimed, it is considered unnecessary to represent the same in the accompanying drawings or describe the same in this specification.

The parts of my improved brake are so arranged that the brake-blocks will be applied, it being immaterial in which direction the rod A is moved, as the arms B will cause the ends of the long lever-arms C to approach each other and apply the brake-blocks E to the tires of the wheels, not only when the said arms are moved in the one but also in the reverse direction. The short lever-arms D are, as represented in Figs. 1 and 2, supported by appropriate bearings K, provided with horizontal guide-slots K', Fig. 5.

In the construction shown in Fig. 6 the brake-blocks E are applied to both sides of the wheels, so that the same can be braked in shorter time than by any other system and without the usual unfavorable one-sided action on the tires. The movement of the brake-blocks is effected by shear-like bell-crank levers C' D' C² D², arranged pairwise above each other and turning on a pivot F', fixed in the lower rail or rod H. The bell-crank levers are in this case, as also in the construction represented by Figs. 3 and 4, connected to the braking-rod A by means of the pivot G'. According to this construction two pairs of bell-crank levers C' D' C² D² are employed for each pair of wheels, which are braked from both sides. It is in this case also desirable to employ the bearings K for supporting and guiding the lever-arms D' D².

Fig. 7 relates to a modified arrangement according to which the arms B' are replaced by chains B², which connect the ends of the lever-arms C' C² and run through guide-rollers J, so that when the same are moved backward or forward the arms C' C² of the bell-crank lever are caused to approach each other and the brake-blocks attached to the arms D' D² of the said bell-crank lever pressed onto the wheels. If necessary, the bell-crank levers can be stiffened by stays L. (Shown by the dotted lines in Fig. 4.)

By employing lever-arms C C of corresponding length I am able to produce not only a very powerful braking action by using comparatively little force, but a very rapid application of the brake-blocks, whereas the arrangement of the brake whereby the movement of the rod A in one or the other direction will cause the brake-blocks to be applied can be employed for vehicles independent of the direction in which the same are driven.

I desire it to be understood that I do not confine myself to the special arrangements of the parts as shown in the accompanying drawings, as the same can be modified in many ways without departing from the nature of my said invention.

Having now particularly described and ascertained the nature of my said invention, and in what manner the same is to be performed, I declare that what I claim is—

1. In a brake for railway and tramway vehicles, the combination, with the brake-shoes, of bent or angle levers connected one with each shoe by its laterally-extending arm and transverse connections, and longitudinal rod A, movable in either direction for simultaneously drawing inward the longitudinal arms of said levers, substantially as set forth.

2. In a brake for vehicles, the combination, with the brake-blocks mounted on bell-crank shears-like levers, of the chain-disk and chain for drawing together the arms of said levers and brake-blocks, and a spring for causing the brake-block levers to recede from each other, thereby releasing the brake-blocks from the wheels, substantially as set forth.

3. A brake which can be applied to one or both sides of the wheels of railway and tramway vehicles, consisting of the brake-blocks, brake-block levers, rod A, running longitudinally under the vehicle for actuating the said levers, and articulated arms or a chain connecting said levers and engaged by the rod, said brake-blocks being applied to the wheels regardless of the direction in which the rod A is moved, substantially as set forth.

In witness whereof I have hereunto signed my name in the presence of two subscribing witnesses.

ALBERT PAUL.

Witnesses:
ANTHONY STEFFEN,
FRED J. DOWNING.